Feb. 25, 1936.    H. F. UMSTOTT    2,032,104
WAFFLE IRON HEATER
Filed Sept. 23, 1933
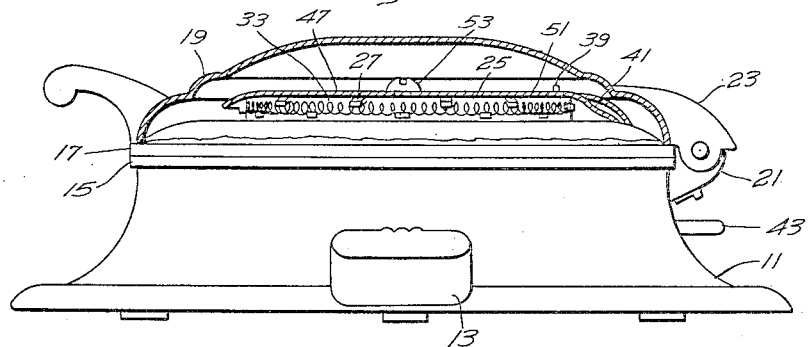
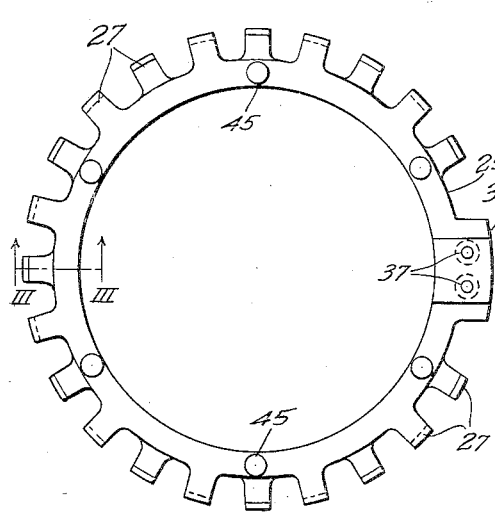
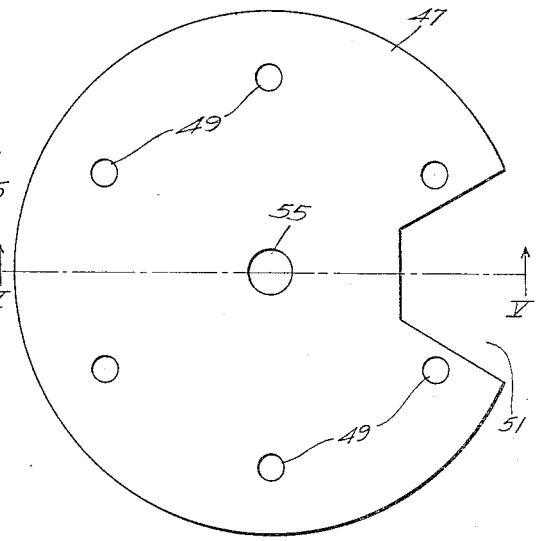
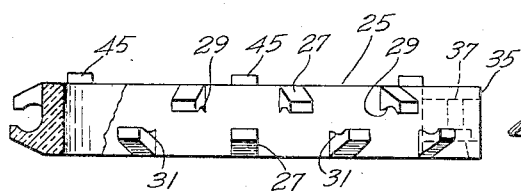
WITNESSES —
INVENTOR
Harold F. Umstott.
BY
ATTORNEY Patented Feb. 25, 1936

2,032,104

UNITED STATES PATENT OFFICE 2,032,104

WAFFLE IRON HEATER

Harold F. Umstott, Mansfield, Ohio, assignor to Westinghouse Electric & Manufacturing Company, East Pittsburgh, Pa., a corporation of Pennsylvania Application September 23, 1933, Serial No. 690,680

5 Claims. (Cl. 219—19)

My invention relates to electric heating units and particularly to electric heating units for use with waffle irons.

An object of my invention is to provide an electrical heating unit having relatively few parts that may be easily and quickly assembled.

Another object of my invention is to provide an electrical heating unit that embodies relatively simple means for holding it against a surface of a body to be heated thereby.

Another object of my invention is to provide an electrical heating unit that shall embody a resilient clamping and heat-reflecting plate interfitting with the resistor-supporting member.

Other objects will either be apparent from the following description of a preferred form of device embodying my invention or will be pointed out hereinafter.

In practicing my invention, I provide an annulus of refractory electric insulating material having a pair of spaced rows of staggered and oppositely extending projections or teeth thereon to receive and support a resistor and a clamping and heat-reflecting plate interfitting therewith.

In the drawing,

Figure 1 is a view, mainly in side elevation, with a part cut away to show a device embodying my invention, Fig. 2 is a top plan view of a refractory resistor support embodying my invention, Fig. 3 is a view in side elevation thereof with a part shown in section taken on the line III—III of Fig. 2, Fig. 4 is a top plan view of a clamping and heat-reflecting plate, and Fig. 5 is a section therethrough taken on the line V—V of Fig. 4.

Referring first to Fig. 1 of the drawing, I have there shown a waffle iron as including a suitable base 11 having handles 13 thereon, only one of which is visible in the drawing, and including also two baking surfaces 15 and 17. Lower baking element 15 is operatively associated with the lower casing 11 while the upper baking surface or plate or element 17 is operatively associated with an upper casing 19, which casing is shown in section in order to illustrate the location of the improved heating unit embodying my invention. The waffle iron assembly includes also a lower hinge bracket 21 and an upper hinge bracket 23 cooperating therewith to permit of pivotally moving the upper part of the waffle iron including particularly the casing 19 and the baking surface 17 away from and toward the lower portion thereof. While I have illustrated and described a specific embodiment of a pair of cooperating casings and hinge members, these constitute no part of my invention and are shown for illustrative purposes only.

Fig. 2 illustrates in top plan view a refractory resistor-supporting member 25 which is also shown in front elevation in Fig. 3 of the drawing. Member 25 includes an annulus of a refractory electric insulating material such as clay or porcelain, the outer surface of which is provided with two rows of peripherally spaced projections or teeth 27. The teeth 27 in the lower row are staggered relatively to the teeth 27 in the upper row and preferably, of course, the teeth 27 are integral with the annular portion of member 25. The teeth 27 are oppositely bent so as to extend toward each other: that is, the teeth in the upper row are so recessed, as shown at 29 in Fig. 3 and the lower teeth 27 are so recessed, as shown more particularly at 31 in Fig. 3 of the drawing, as to provide supports for a helically wound resistor indicated at 33 in Fig. 1 of the drawing. It is to be noted that the helically wound resistor wire 33 may be placed in proper operative position between the two rows of teeth 27 in a very simple and easy manner, and I have found that the usual heating element will be made of sufficiently heavy wire, so that when wound into helical shape, it will not sag appreciably between adjacent teeth 27 in the lower row of teeth.

The member 25 includes also a lug or projection 35 at one point thereon which is provided with two axially extending openings 37 to receive terminal bolts 39, a part only of which are visible in Fig. 1 of the drawing. Thus, the ends of the heating element 33 are suitably connected to the respective terminal bolts 39 and conductors or leads 41 shown more particularly in Fig. 1 of the drawing, connect the heating element in the upper casing to a substantially similar heating element in the lower casing and to two terminal pins 43 which may be insulatedly mounted in and supported by the member 11.

The annular portion of member 25 is further provided on its upper radial surface with a plurality of spaced bosses 45, which bosses interfit with a suitably perforated clamping and reflector plate or baffle disc 47 shown more particularly in Figs. 4 and 5 of the drawing. The plate 47 is substantially flat for the greater part of its diameter but is curved downwardly for a small portion of its outer periphery (see Fig. 5) so as to overhang the heating element 33, for the purpose of reducing heat radiation away from the surface of baking plate 17. Plate 47 is provided with a plurality of openings 49 therethrough which register with the bosses 45, which latter are adapted to extend through the openings 49 to cause an interfit of the clamping plate and of the refractory resistor-supporting member 25. The plate 47 is provided with a peripheral recess 51, as shown in Figs. 4 and 5 of the drawing, which recess is located over the projection 35 and the terminal bolts supported directly thereby.

A relatively simple clamping and holding means is provided in the form of a machine bolt 53 which extends through a central opening 55 in the resilient plate 47 and into a suitable screw threaded opening in the upper baking plate 17. While I have shown a machine bolt or screw, it is, of course, obvious that any other equivalent securing means may be provided, such as a stud having one threaded end engaging the baking plate 17 and a nut on the other end thereof on the outside of and against the plate 47 in a manner well known in the art.

As the plate 47 is made thin enough to be resilient, it is possible to effect a very quick and highly efficient assembly of the heating unit embodying more particularly the annulus 25 and the resistor 33 supported thereby against the rear of the baking plate or surface 17 by means of the plate 47 which has interfitting engagement with the annulus 25.

The peripheral portion of disc or plate 47 is finished with a bright aluminum, bronze lacquer, while the plate itself may be made of heat resistant silicon steel. I do not, however, wish to be limited to these or other particular details of construction shown, as they may be varied without departing from the spirit and scope of my invention, which is to be limited only by the prior art or by the appended claims.

I claim as my invention:

1. A heating unit including an annulus of refractory electric-insulating material having a plurality of spaced, staggered and alternately oppositely-bent radial projections on one peripheral surface and a resistor element extending between the oppositely bent projections adjacent said peripheral surface of the annulus.

2. A heating unit including an annulus of refractory electric insulating material having a pair of spaced rows of radial projections on one peripheral surface, the projections in one row being staggered relatively to and extending toward those in the other row, and a hellically wound resistor extending adjacent to said peripheral surface between said spaced rows of projections.

3. A heating unit adapted to be located against a material surface to be heated including an annulus of refractory electric-insulating material having a plurality of spaced, staggered alternately-oppositely-extending radial lugs on one peripheral surface, a resistor located wholly on the outside of said annulus between said lugs and a reflector clamping disc interfitting with the annulus and located against a radial surface thereof, and means drawing the clamping disc against the annulus to hold it in proper operative position against the surface to be heated.

4. A heating unit adapted to be located against a plate to be heated thereby including an annulus of refractory electric-insulating material having a plurality of spaced staggered alternately oppositely-extending hook-shaped lugs on one peripheral surface and having also a plurality of spaced projections on the outer radial surface, a helically wound resistor wire supported adjacent to the peripheral surface by and between the hook-shaped lugs, a reflector clamping plate having spaced openings therein to receive the spaced projections on the annulus and adapted to be located against the outer radial surface thereof, and a clamping bolt extending through the clamping plate and into the plate to be heated to hold the clamping plate in interlocked relation with the annulus and the annulus against the plate to be heated.

5. A heating unit adapted to be located against one surface of a plate to be heated thereby including an annulus of ceramic material having a terminal-supporting lug and two spaced rows of teeth staggered relatively to each other on its outer peripheral surface and a plurality of bosses on its outer radial surface, a helically wound resistor wire extending along the outer peripheral surface of the annulus between the rows of teeth and having its ends located at said terminal-supporting lug, a baffle disc having a plurality of openings therethrough to receive the bosses, the peripheral portion of the baffle disc being concave against the annulus and resistor to reduce heat radiation away from the surface of the plate, and a bolt extending through the baffle disc and annulus and into the plate to hold the members in proper operative positions relatively to each other.

HAROLD F. UMSTOTT.